US010193458B2

(12) United States Patent
Quigley (10) Patent No.: US 10,193,458 B2
(45) Date of Patent: *Jan. 29, 2019

(54) START-UP CONTROLLER FOR A POWER CONVERTER

(71) Applicant: Microchip Technology Incorporated, Chandler, AZ (US)

(72) Inventor: Thomas Quigley, Newark Valley, NY (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,850

(22) Filed: Nov. 14, 2017

(65) Prior Publication Data
US 2018/0109197 A1    Apr. 19, 2018

Related U.S. Application Data

(62) Division of application No. 14/945,729, filed on Nov. 19, 2015, now Pat. No. 9,819,274.
(Continued)

(51) Int. Cl.
*H02M 3/335* (2006.01)
*H02M 1/36* (2007.01)

(52) U.S. Cl.
CPC ......... *H02M 3/33546* (2013.01); *H02M 1/36* (2013.01); *H02M 3/33523* (2013.01)

(58) Field of Classification Search
CPC ........... H02M 1/36; H02M 2001/0009; H02M 2001/0032
See application file for complete search history.

(56) References Cited

U.S. PATENT DOCUMENTS 4,967,332 A * 10/1990 Claydon ................. H02M 1/38
                                                                363/132
5,301,095 A    4/1994 Teramoto et al. ......... 363/21.07
(Continued)

FOREIGN PATENT DOCUMENTS

CN    101651426 A    2/2010    ............ H02M 7/217
CN    102361402 A    2/2012    .............. H02M 1/36
(Continued)

OTHER PUBLICATIONS

DE 102008027054 A1, U.S. Pat. No. 7,746,672 B2.
(Continued)

*Primary Examiner* — Yusef A Ahmed
(74) *Attorney, Agent, or Firm* — Slayden Grubert Beard PLLC (57) ABSTRACT

Power converters, e.g., AC/DC and DC/DC, typically have unique circuitry for a proper graceful start-up and to develop correct operating voltage biases. Typically this unique circuitry is incorporated in a primary-side controller. This primary-side controller could also be the primary means of control of the power converter once started. However, a secondary-side controller is typically needed for more exact output voltage regulation, duplicating circuitry already present in the primary-side controller. Complication is typically added by linear communication between the two controllers across an isolation barrier. A simplified primary-side start-up controller is envisioned providing minimal circuitry to power up a converter until a secondary-side controller activates and takes control by sending discrete PWM commands across the isolation barrier instead of a linear signal. The start-up controller can provide voltage and current protection if the secondary-side controller fails. The secondary-side controller can be an analog and/or digital design for sophisticated converter control.

13 Claims, 4 Drawing Sheets

Related U.S. Application Data (60) Provisional application No. 62/082,317, filed on Nov. 20, 2014.

(56) References Cited

U.S. PATENT DOCUMENTS

| | | | | |
|---|---|---|---|---|
| 5,498,995 | A * | 3/1996 | Szepesi | H02M 3/33507 327/101 |
| 5,757,627 | A | 5/1998 | Faulk | 363/21.14 |
| 6,188,276 | B1 * | 2/2001 | Simopoulos | H02M 3/33576 330/10 |
| 6,456,511 | B1 * | 9/2002 | Wong | H02M 1/36 363/21.13 |
| 6,490,177 | B1 | 12/2002 | Figueroa | 363/21.03 |
| 6,504,267 | B1 | 1/2003 | Giannopoulos | 307/31 |
| 7,746,672 | B2 * | 6/2010 | Nishikawa | H02M 3/33515 363/21.07 |
| 9,331,583 | B2 * | 5/2016 | Zhang | H02M 3/33507 |
| 2001/0043479 | A1 * | 11/2001 | Nagai | H02M 3/335 363/20 |
| 2002/0006045 | A1 | 1/2002 | Shirai et al. | 363/17 |
| 2002/0125867 | A1 | 9/2002 | Choo et al. | 323/282 |
| 2007/0133234 | A1 * | 6/2007 | Huynh | H02M 3/33507 363/20 |
| 2007/0252563 | A1 * | 11/2007 | Kumagai | H02M 3/158 323/267 |
| 2008/0259655 | A1 | 10/2008 | Wei et al. | 363/21.18 |
| 2008/0265133 | A1 | 10/2008 | Sawtell et al. | 250/206 |
| 2009/0010027 | A1 | 1/2009 | Nishikawa | 363/21.01 |
| 2009/0261790 | A1 | 10/2009 | Arduini | 323/266 |
| 2009/0273324 | A1 * | 11/2009 | Okamoto | H02M 1/36 323/282 |
| 2009/0295346 | A1 * | 12/2009 | Matthews | H02M 3/00 323/267 |
| 2009/0295349 | A1 * | 12/2009 | Tao | H02M 3/33507 323/282 |
| 2010/0194198 | A1 * | 8/2010 | Djenguerian | H02M 3/33507 307/31 |
| 2010/0208500 | A1 * | 8/2010 | Yan | H02M 3/33523 363/21.12 |
| 2010/0308875 | A1 | 12/2010 | Fitzgerald | 327/142 |
| 2010/0327761 | A1 | 12/2010 | Jin | 315/219 |
| 2011/0019446 | A1 * | 1/2011 | Wu | H02M 3/33523 363/79 |
| 2011/0032732 | A1 | 2/2011 | Hsu | 363/21.14 |
| 2011/0075448 | A1 | 3/2011 | Melanson | 363/20 |
| 2011/0103104 | A1 * | 5/2011 | Zhan | H02M 3/33507 363/21.17 |
| 2011/0164437 | A1 | 7/2011 | Sun et al. | 363/16 |
| 2011/0211370 | A1 | 9/2011 | Luo et al. | 363/21.02 |
| 2011/0305043 | A1 * | 12/2011 | Matsumoto | H02M 3/33592 363/21.01 |
| 2012/0099345 | A1 | 4/2012 | Zhao et al. | 363/21.05 |
| 2012/0139342 | A1 * | 6/2012 | Bailey | H02M 3/33523 307/31 |
| 2012/0139477 | A1 | 6/2012 | Oglesbee et al. | 320/107 |
| 2012/0230069 | A1 | 9/2012 | Tzeng et al. | 363/49 |
| 2012/0243271 | A1 * | 9/2012 | Berghegger | H02M 3/33507 363/21.15 |
| 2012/0262953 | A1 | 10/2012 | Jungreis et al. | 363/17 |
| 2012/0280642 | A1 * | 11/2012 | Lin | H02P 6/20 318/400.11 |
| 2012/0294048 | A1 | 11/2012 | Brinlee | 363/21.18 |
| 2013/0016535 | A1 | 1/2013 | Berghegger | 363/21.15 |
| 2013/0155728 | A1 | 6/2013 | Melanson et al. | 363/21.16 |
| 2013/0194020 | A1 | 8/2013 | Shen et al. | 327/333 |
| 2013/0223108 | A1 * | 8/2013 | Xu | H02M 3/335 363/21.17 |
| 2013/0229829 | A1 | 9/2013 | Zhang et al. | 363/16 |
| 2013/0236203 | A1 | 9/2013 | Nakajima et al. | 399/88 |
| 2013/0300384 | A1 * | 11/2013 | Wang | H02M 3/33523 323/271 |
| 2013/0301308 | A1 | 11/2013 | Hosotani | 363/21.03 |
| 2014/0028095 | A1 | 1/2014 | Maru et al. | 307/31 |
| 2014/0140107 | A1 | 5/2014 | Chen et al. | 363/21.15 |
| 2014/0160810 | A1 | 6/2014 | Zheng | 363/21.17 |
| 2014/0253225 | A1 * | 9/2014 | Lee | H04L 25/4902 327/535 |
| 2014/0253227 | A1 * | 9/2014 | Yach | H04L 25/4902 327/540 |
| 2014/0254214 | A1 | 9/2014 | Balakrishnan et al. | 363/21.15 |
| 2014/0254215 | A1 | 9/2014 | Brinlee et al. | 363/21.15 |
| 2014/0313790 | A1 | 10/2014 | Feng et al. | 363/21.02 |
| 2014/0313794 | A1 * | 10/2014 | Ono | H02M 3/33523 363/21.15 |
| 2014/0321170 | A1 * | 10/2014 | Tumasz | H02M 3/33538 363/21.09 |
| 2014/0369086 | A1 | 12/2014 | Hayasaki | 363/21.14 |
| 2015/0016152 | A1 | 1/2015 | Kojima | 363/21.02 |
| 2015/0023063 | A1 | 1/2015 | Perreault et al. | 363/17 |
| 2015/0091544 | A1 * | 4/2015 | Jayaraj | H02M 3/156 323/284 |
| 2015/0124488 | A1 | 5/2015 | Dai et al. | 363/17 |
| 2015/0280573 | A1 | 10/2015 | Gong et al. | 363/21.14 |
| 2015/0280584 | A1 | 10/2015 | Gong et al. | 363/21.13 |
| 2016/0079878 | A1 | 3/2016 | Lin et al. | 363/21.14 |
| 2016/0087541 | A1 * | 3/2016 | Xie | H02M 3/33592 363/21.06 |
| 2016/0141951 | A1 * | 5/2016 | Mao | H02M 1/36 363/21.02 |
| 2016/0149504 | A1 * | 5/2016 | Quigley | H02M 1/36 363/21.04 |
| 2016/0190938 | A1 * | 6/2016 | Wang | H02M 3/33507 363/21.12 |
| 2016/0226239 | A1 * | 8/2016 | Yang | H02M 1/32 |
| 2016/0352231 | A1 * | 12/2016 | Quigley | H02M 3/33507 |
| 2016/0352237 | A1 * | 12/2016 | Quigley | H02M 3/33546 |
| 2017/0054376 | A1 * | 2/2017 | Quigley | H02M 3/33507 |

FOREIGN PATENT DOCUMENTS

| | | | | |
|---|---|---|---|---|
| DE | 102008027054 A1 | 1/2009 | | H02M 3/28 |
| EP | 0618665 A2 | 10/1994 | | H02M 3/28 |
| EP | 2775602 A2 | 9/2014 | | H02M 3/156 |

OTHER PUBLICATIONS

"IEEE 802.3af PD with Current Mode Switching Regulator," Freescale Semiconductor, Document No. MC34670, URL: http://www.nxp.com/files/analog/doc/data_sheet/MC34670.pdf, 24 pages, Dec. 31, 2006.

Microchip Technology Incorporated, "HV9910C: Universal High-Brightness LED Driver," URL: http://ww1.microchip.com/downloads/en/DeviceDoc/20005323A.pdf, 18 pages, Mar. 25, 2014.

On Semiconductor, "NCP1249A/B + NCP4355B: Very Low No-Load Power Consumption Flyback Converter with Peak Power Excursion Evaluation Board User's Manual," XP055312861, URL: http://www.onsemi.com/pub/Collateral/EVBUM2221-D.pdf, 30 pages, Apr. 30, 2014.

International Search Report and Written Opinion, Application No. PCT/US2015/061769, 13 pages, dated Mar. 11, 2016.

U.S. Appl. No. 15/168,390, 23 pages, filed May 31, 2016.

International Search Report and Written Opinion, Application No. PCT/US2016/035139, 13 pages, dated Aug. 30, 2016.

International Search Report and Written Opinion, Application No. PCT/US2016/035149, 13 pages, dated Sep. 9, 2016.

International Search Report and Written Opinion, Application No. PCT/US2016/047949, 16 pages, dated Nov. 8, 2016.

U.S. Non-Final Office Action, U.S. Appl. No. 14/945,729, 36 pages, dated Mar. 29, 2017.

U.S. Notice of Allowance, U.S. Appl. No. 15/241,993, 22 pages, dated Apr. 5, 2017.

U.S. Non-Final Office Action, U.S. Appl. No. 15/168,390, 32 pages, dated Jul. 27, 2017.

U.S. Non-Final Office Action, U.S. Appl. No. 15/168,569, 22 pages, dated Jul. 20, 2018.

European Office Action, Application No. 16732045.6, 7 pages, dated Oct. 2, 2018.

(56) References Cited

OTHER PUBLICATIONS

Chinese Office Action, Application No. 201580062068.5, 5 pages, dated Dec. 5, 2018.

* cited by examiner

START-UP CONTROLLER FOR A POWER CONVERTER

RELATED PATENT APPLICATION

This application is a Divisional of U.S. patent application Ser. No. 14/945,729 filed on Nov. 19, 2015, which claims priority to commonly owned U.S. Provisional Patent Application No. 62/082,317; filed Nov. 20, 2014; which are hereby incorporated by reference herein for all purposes.

TECHNICAL FIELD

The present disclosure relates to power converters, and, in particular, to start-up controller methods and apparatus for DC-to-DC and AC-to-DC power converters.

BACKGROUND

Figure 3:
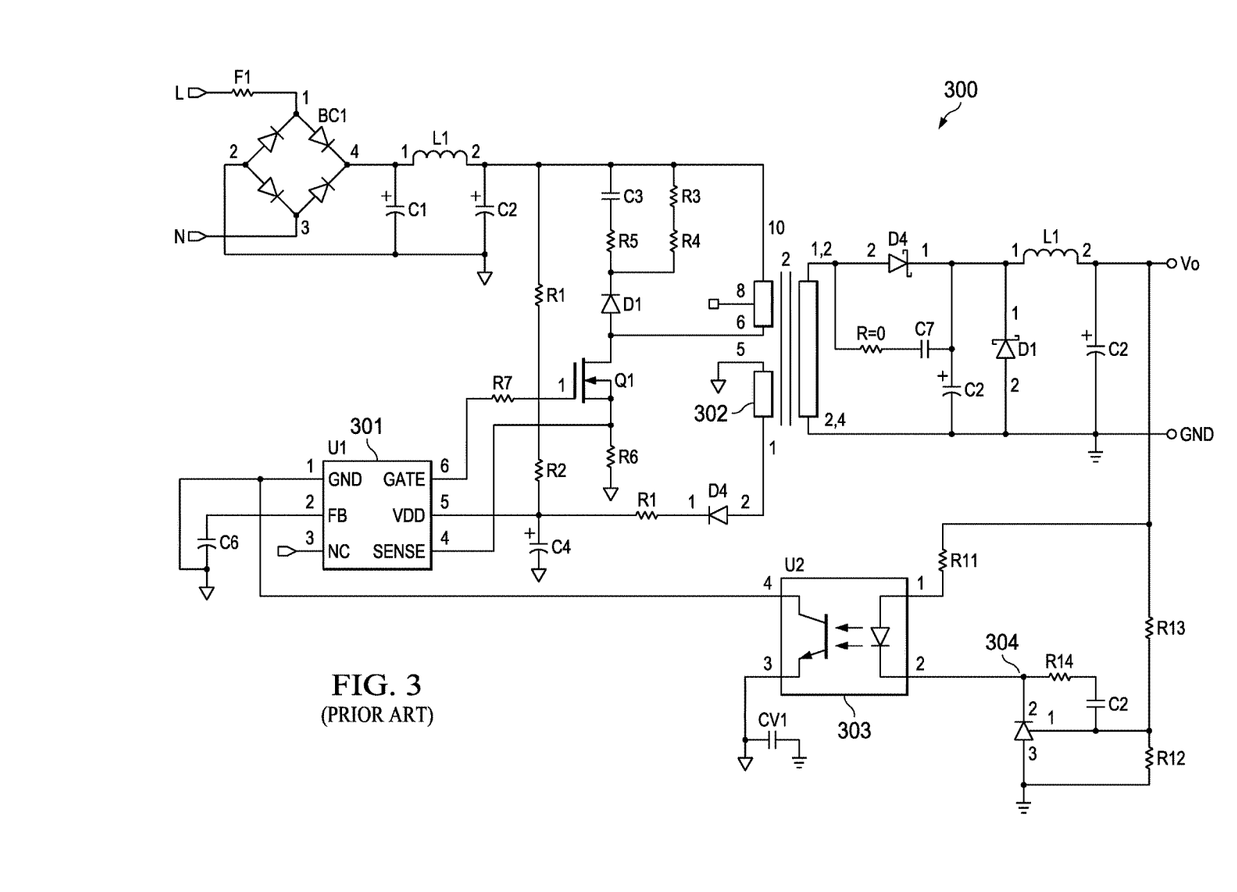
FIG. 3 illustrates a schematic diagram of a prior art flyback converter.

Power converters, e.g., DC-to-DC and AC-to-DC, typically have unique circuitry for a proper graceful start-up (soft start) and to develop correct operating voltage biases. This unique circuitry may require custom integrated circuits and/or proprietary designs which may increase the cost and delivery schedule of such power converters. FIG. 3 illustrates a schematic diagram of a prior art flyback converter. Transformer T1 is shown having a primary-side bias winding 302. This is used to bias the Primary-Side Controller device 301 via its VDD port. The voltage at VDD is cross-regulated to the output voltage Vo via transformer coupling. Therefore it is possible to regulate the voltage at Vo by a controller 301 monitoring the voltage at its VDD port. Typically regulating Vo using transforming coupling to the controller 301 is not accurate enough for most applications, therefore an additional feedback path is needed from the secondary-side of the flyback converter 300 to its primary side. Voltage reference 304 (U3) is a device that provides a precision reference (Vo is compared to that precision reference), a voltage error amplifier (with its compensation components for stability) and a driver for driving an optical isolation coupler (optocoupler) 303. The controller 301 also contains a precision reference and voltage amplifier, but these circuits are not utilized when the additional feedback path is included. The optocoupler 303 is driven linearly. Therefore the current transfer ratio (CTR) of the optocoupler 303 is an issue. CTR adds gain to the additional feedback path. This gain can vary from device to device, and a device's CTR can change as it ages.

The controller 301 is located on the primary-side of the flyback converter 300. The secondary-side of the flyback converter 300 is where the load (application) is coupled. Typically the application device (not shown) contains a microprocessor with its capability of programmability. The controller 301 is isolated from the benefits that programming can provide for more sophisticated flyback converter control techniques. The power MOSFET switch Q1 is an external device, resistor R6 is an external resistor that scales the voltage analogous to current through the MOSFET switch Q1 and is used by the controller 301 for current sensing.

SUMMARY

Therefore there is a need for a low cost solution to start-up power converters using a conventional, low cost integrated circuit (IC) solution on the primary side that does not duplicate the resources of a secondary side controller and minimizes discrete components on the primary side electronic devices.

According to an embodiment, a method for starting up a power converter may comprise the steps of: applying a first DC voltage to a start-up controller; turning on and off a power switch with the start-up controller, wherein the first DC voltage and the power switch may be coupled to a primary winding of a transformer, whereby an AC voltage may be produced on a secondary winding of the transformer; rectifying the AC voltage from the secondary winding of the transformer with a second rectifier to provide a second DC voltage for powering a secondary-side controller and a load; and transferring control of the power switch from the start-up controller to the secondary-side controller when the second DC voltage may be at a desired voltage value.

According to a further embodiment of the method, the start-up controller may be initially powered directly from the first DC voltage and then from a tertiary winding of the transformer. According to a further embodiment of the method, the step of turning on and off the power switch with the start-up controller may comprise the steps of: turning on the power switch until a maximum current through the primary winding of the transformer may be reached; and thereafter turning off the power switch for a fixed time period. According to a further embodiment of the method, the fixed time period may be determined by a capacitance value of a capacitor coupled to the start-up controller.

According to a further embodiment of the method, decoupling the load from the second DC voltage until requested to couple the load to the second DC voltage. According to a further embodiment of the method, the load may be coupled to the second DC voltage after the secondary-side controller starts controlling the power switch. According to a further embodiment of the method, preventing an overvoltage of the second DC voltage may be provided by coupling a voltage shunt thereacross. According to a further embodiment of the method, the voltage shunt may be a Zener diode having a breakdown voltage higher than a desired value for the second DC voltage.

According to a further embodiment of the method, the step of transferring control of the power switch from the start-up controller to the secondary-side controller may comprise the steps of: sending PWM signals from the secondary-side controller to the start-up controller when the second DC voltage may be at the desired voltage value; detecting the PWM signals from the secondary-side controller with the start-up controller; and turning on and off the power switch with the detected PWM signals from the secondary-side controller.

According to a further embodiment of the method, the second DC voltage may be regulated by the secondary-side controller after the start-up controller detects the PWM signals from the secondary-side controller. According to a further embodiment of the method, the step of controlling the power switch further comprises the steps of: turning on and off the power switch at a low frequency with the start-up controller to conserve power; and turning on and off the power switch at a higher frequency with the secondary-side controller.

According to a further embodiment of the method, the step of sending PWM signals from the secondary-side controller to the start-up controller further comprises the step of sending PWM signals through a voltage isolation circuit. According to a further embodiment of the method, the voltage isolation circuit may be an optical-coupler. According to a further embodiment of the method, the voltage isolation circuit may be a pulse transformer. According to a further embodiment of the method, the AC-to-DC power converter may comprise an AC-to-DC flyback power converter. According to a further embodiment of the method, the AC-to-DC power converter may comprise an AC-to-DC forward power converter.

According to a further embodiment of the method, the start-up controller may protect a power switch driver from under and over voltages. According to a further embodiment of the method, the step of limiting a maximum allowable transformer primary winding current may be proved with the start-up controller. According to a further embodiment of the method, the step of preventing the flyback power converter from going into too deep a continuous conduction mode may be provided with a current-sense comparator, whereby the flyback power converter may be protected from an overcurrent fault.

According to a further embodiment of the method, may comprise the steps of: providing bias voltage to the start-up controller from a primary-side tertiary winding of the transformer, wherein the bias voltage may be coupled to the second DC voltage and provides voltage feedback thereof; detecting an overvoltage condition from the bias voltage when the secondary side controller fails to properly operate; and locking out the start-up controller when the overvoltage condition may be detected.

According to a further embodiment of the method, providing a linear regulator between an output of a primary-side tertiary winding of the transformer and a bias input of the start-up controller. According to a further embodiment of the method, clamping a secondary side reset winding of the transformer to provide a transformer reset. According to a further embodiment of the method, providing initial bias for the secondary-side controller from an active clamp circuit until a bias from a tertiary winding of an output filter inductor may be established. According to a further embodiment of the method, applying AC power to a first rectifier for providing the first DC voltage.

According to another embodiment, a power converter may comprise: a start-up controller coupled to a first DC voltage; a transformer having primary and secondary windings, wherein the transformer primary winding may be coupled to the first DC voltage; a current measurement circuit for measuring current through the primary winding of the transformer and providing the measured primary winding current to the start-up controller; a power switch coupled to the transformer primary, and coupled to and controlled by the start-up controller; a secondary-side rectifier coupled to the transformer secondary winding for providing a second DC voltage; a secondary-side controller coupled to the start-up controller and the secondary-side rectifier; wherein when the start-up controller receives the first DC voltage it start to control the power switch on and off whereby a current flows through the transformer primary, an AC voltage develops across the transformer secondary winding, a DC voltage from the secondary side rectifier powers up the secondary-side controller, and the secondary-side controller takes over control of the power switch from the start-up controller when the second DC voltage reaches a desired voltage level.

According to a further embodiment, the power converter may comprise a flyback power converter. According to a further embodiment, the power converter may comprise a forward power converter. According to a further embodiment, a switching post regulator may be coupled between the secondary side rectifier and a load, wherein the switching post regulator may be controlled by the secondary-side controller. According to a further embodiment, the power switch may be a power metal oxide semiconductor field effect transistor (MOSFET).

According to a further embodiment, the secondary-side controller may be coupled to and control the start-up controller through an isolation circuit. According to a further embodiment, the isolation circuit may be an optocoupler. According to a further embodiment, the isolation circuit may be a pulse transformer.

According to a further embodiment, a fixed off time circuit may be provided for keeping the power switch off for a certain time period after the start-up controller has turned off the power switch. According to a further embodiment, the certain time period may be determined by a capacitance value of a capacitor coupled to the fixed off time circuit. According to a further embodiment, an AC-to-DC rectifier and filter adapted for coupling to an AC power source and used to provide the first DC voltage. According to a further embodiment, a microcontroller integrated circuit may comprise the power converter.

According to yet another embodiment, a start-up controller may comprise: a high voltage regulator having an input and an output; internal bias voltage circuits coupled to the high voltage regulator output; under and over voltage lockout circuits coupled to the high voltage regulator output; a current regulator; logic circuits for generating pulse width modulation (PWM) control signals; a fixed off time circuit coupled to the logic circuits; a power driver coupled to the logic circuits and providing PWM control signals for control of an external power switch; an external gate command detection circuit coupled to the logic circuits and adapted to receive an external PWM control signal, wherein when the external PWM control signal may be detected the external gate command detection circuit causes control of the external power switch to change from the logic circuits to the external PWM control signal; and first and second voltage comparators having outputs coupled to the internal current regulator and inputs coupled to a current sense input.

According to a further embodiment, a blanking circuit may be coupled between the current sense input and the first and second voltage comparator inputs. According to a further embodiment, the fixed off time circuit time period may be determined by a capacitance value of a capacitor.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

Power supplies, in particular DC-to-DC and AC-to-DC power converters, typically have unique circuitry to start them up. According to various embodiments of this disclosure, a power converter may comprise a start-up controller and a secondary-side controller, wherein the start-up controller is utilized to send power to the secondary-side controller when power (voltage) is first applied to the primary side of the power converter. This provides a low cost integrated circuit (IC) solution for start-up of a power converter using conventional devices on the primary side that does not duplicate the resources of a secondary-side controller and minimizes discrete components on the primary side.

The start-up controller is specifically designed for starting up a power converter, wherein the start-up controller is located on the primary-side of the power converter and a secondary-side controller is located on an electrically isolated, secondary-side of the power converter (transformer). The start-up controller may have two modes of operation: 1) start-up controller operates as an open loop current regulator, and 2) the start-up controller receiving external PWM commands from the secondary-side controller for control of the power switch. In the open loop current regulator mode the start-up controller is initially powered directly from a DC source voltage, e.g., battery or rectified AC line. During an ON time of the power switch that couples the DC or rectified AC line voltage to the transformer, current in the primary winding of the transformer is allowed to rise to a maximum current level monitored by the start-up controller. The OFF time of the power switch is set by an external capacitor such that the power converter outputs only a small fraction of its rated power capacity. This small fraction of the rated output power charges an output capacitor of the power converter and powers up the secondary-side controller. The load on the power converter may be disconnected during this time.

When the power converter's output charges to a sufficient voltage level the secondary-side controller will activate and take control of the power switch from the start-up controller. As the power converter powers up the start-up controller may receive bias from a primary-side tertiary winding of the transformer. Because the output power is only a small fraction of the power converter's rated power, wherein the output voltage may easily be protected against over-voltage by simple voltage shunt techniques, such as a power Zener diode, if the secondary-side controller fails to operate.

When the start-up controller receives external PWM commands (signals) from the secondary-side controller, the start-up controller switches to an external PWM commands mode when the external PWM commands from the secondary-side controller are detected. Wherein the ON and OFF times of the power switch are determined by the secondary-side controller such that the power converter can deliver its rated power or the power necessary to regulate the output voltage to the load. In normal operation the secondary-side controller regulates the output voltage to the load from the power converter. The secondary-side controller may connect the load to the power converter (either via a switch, or via a switching post regulator).

PWM commands from the secondary-side controller are sent to the start-up controller via an isolation circuit, e.g., an optocoupler or a pulse transformer. The isolation circuit is not required to operate linearly thereby alleviating problems caused by the optocoupler's current transfer ratio (CTR) issues if linear control was used. The secondary-side controller may make use of microprocessor resources located in the load (application) that the power converter is powering such that sophisticated power converter control techniques may be employed.

If the start-up controller ceases receiving external PWM commands it will revert back to its open loop current regulator mode. In either mode the start-up controller protects the power switch driver from under and over voltages. The start-up controller limits the maximum allowable transformer primary current. The start-up controller may be used to start-up either a flyback power converter or a forward power converter. When used in a flyback power converter application the start-up controller has some additional features such as, for example but not limited to, an additional current-sense comparator that prevents the flyback power converter from entering too deeply into a continuous conduction mode of operation, thereby protecting the output of the flyback power converter from an over-current fault condition.

The voltage from the transformer's primary-side tertiary winding, used to bias the start-up controller, may be coupled to the output voltage of the flyback converter. Therefore the voltage on the tertiary winding can be used as an output voltage feedback mechanism that can be used by the start-up controller's over-voltage lockout (OVLO) circuit as an additional level of over-voltage protection if the secondary-side controller fails to operate properly.

When used in a forward converter application the forward converter design may require the following: A linear regulator may be required between the output of the transformer's primary-side tertiary winding and the bias input to the start-up controller. This is due to the fact that the tertiary winding is coupled to the rectified AC voltage and not the converter's output voltage. The forward converter's transformer's reset winding is located on the power converter's secondary side, and is actively clamped to provide a transformer reset. In addition, the active clamp may be designed to provide the initial bias for the secondary-side controller until the main source of bias for the secondary-side controller is established from the tertiary winding of the forward converter's output filter inductor.

Referring now to the drawings, the details of example embodiments are schematically illustrated. Like elements in the drawings will be represented by like numbers, and similar elements will be represented by like numbers with a different lower case letter suffix.

Figure 1:
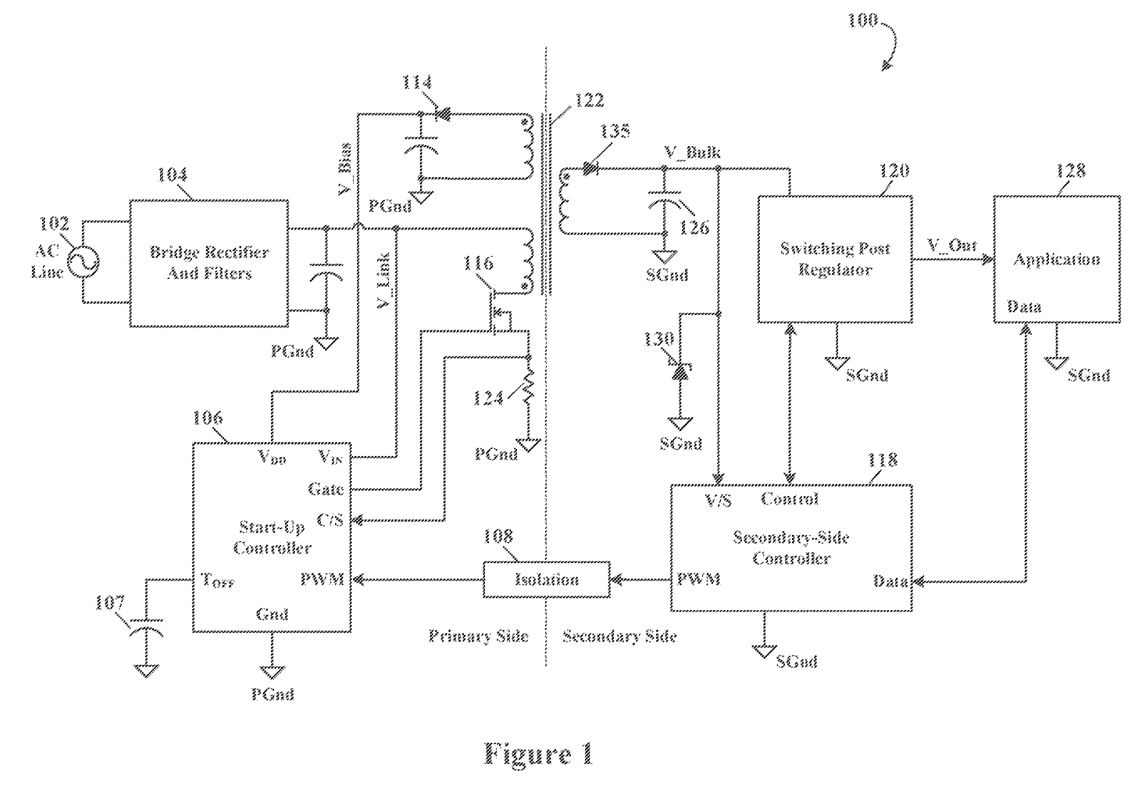
FIG. 1 illustrates a schematic block diagram of a flyback power converter comprising a primary-side start-up technique, according to a specific example embodiment of this disclosure.

Referring now to FIG. 1, depicted is a schematic block diagram of a flyback power converter comprising a primary-side start-up technique, according to a specific example embodiment of this disclosure. A flyback power converter, generally represented by the numeral 100, may comprise a primary side power rectifier and filters 104 coupled to an AC line power source 102, a start-up controller 106, a capacitor 107, a transformer 122, MOSFET switch 116, a current sensing resistor 124, a bias voltage rectifier 114, a power rectifier 135, a Zener diode 130, a secondary-side controller 118, a switching post regulator 120, and an isolation circuit 108. The flyback power converter 100 provides regulated voltage to an application load 128 after start-up. The AC line power source 102 may be in a universal range of from about 85 to 265 volts alternating current (AC) at a frequency of from about 47 Hz to about 63 Hz. It is contemplated and within the scope of this disclosure that the embodiments disclosed herein may be adapted for other voltages and frequencies. A DC source may be used instead of using the primary side power rectifier and filters 104 coupled to an AC source.

When AC line power 102 is applied to the primary side power rectifier and filters 104 a DC voltage, V_Link, results. This DC voltage, V_Link, is coupled to the primary of transformer 122 and the $V_{IN}$ input of the start-up controller 106. The start-up controller 106 becomes active when the voltage, V_Link, reaches a sufficient voltage for proper operation thereof. Once activated the start-up controller 106 starts driving the MOSFET switch 116 from its gate node (output pin). The start-up controller 106 controls the switching of the MOSFET switch 116 in an open-loop manner based upon regulation of the peak current through the MOSFET switch 116. A voltage is developed across resistor 124 in series with the MOSFET switch 116 and primary of the transformer 122 that is proportional to the peak current therethrough. This voltage is coupled to the C/S (current sense) input of the start-up controller 106 which senses it and adjusts the on time of the MOSFET switch 116 to limit the peak current to a certain design value. An internal linear regulator (see FIG. 2, regulator 230) in the start-up controller 106, whose input is the DC voltage, V_Link, regulates a voltage, $V_{DD}$, usable by the internal circuits of the start-up converter 106. $V_{DD}$ is the peak voltage at the gate node of the start-up controller 106. Initially, the internal linear regulator supplies $V_{DD}$ for operation of the start-up controller 106, but once a DC voltage is provided from a primary-side tertiary winding of the transformer 122 through the power diode 114 this internal linear regulator stops supplying current to the internal circuits of the start-up controller 106. This allows internal thermal dissipation in the start-up controller 106 to be reduced.

Driving the MOSFET switch 116 on and off will cause the transformer 122 through rectifier 135 to charge a capacitor 126 to a voltage, V_Bulk. The switching post regulator 120 is off, therefore no output voltage, V_Out, is present therefrom. Thus the application load 128 is isolated from the output of the transformer 122. As the voltage, V_Bulk, increases the secondary-side controller 118 becomes active. When the voltage, V_Bulk, at the V/S input of the secondary-side controller 118 reaches a desired value the secondary-side controller 118 will start controlling the gate output from the start-up controller 106 by sending pulse width modulation (PWM) commands via an isolation circuit 108 to the PWM input of the start-up controller 106. Now the secondary-side controller 118 controls the MOSFET switch 116.

The transformer 122 also provides bias voltage, V-Bias, via diode 114. V-Bias may be cross-regulated to the start-up controller 106 by transformer coupling. The winding turns ratio of the transformer 122 is such that V_Bias is higher than the output voltage set point of the internal linear voltage regulator 230 (FIG. 2) of the start-up controller 106, thereby effectively shutting off this internal linear voltage regulator 230 and reducing the internal thermal dissipation of thereof. Once V_Bulk has risen to its design voltage the secondary-side controller 118 will control the switching post regulator 120 to provide V_Out to the application load 128, thereby power loading the flyback converter 100.

Figure 2:
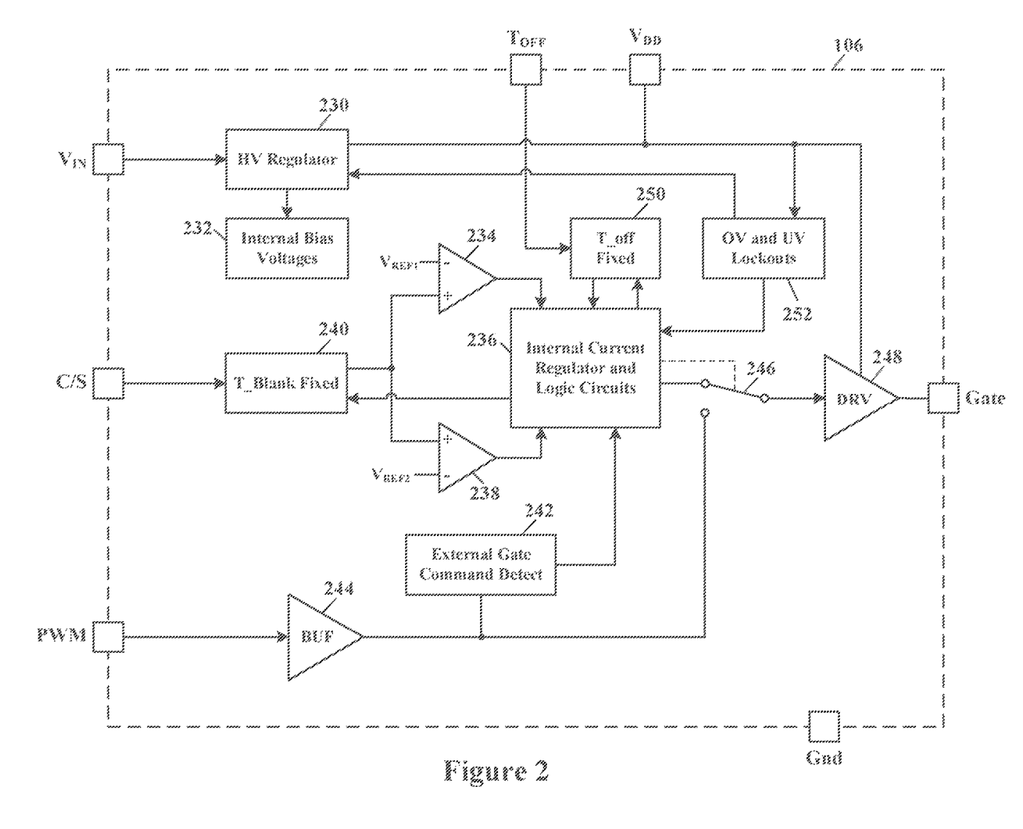
FIG. 2 illustrates a schematic block diagram of a start-up controller, according to specific example embodiments of this disclosure.

Referring now to FIG. 2, depicted is a schematic block diagram of a start-up controller, according to specific example embodiments of this disclosure. The start-up controller 106 may comprise a high voltage regulator 230, internal bias voltage circuits 232, a first voltage comparator 234, a second voltage comparator 238, a fixed blanking time circuit 240, internal current regulator and logic circuits 236, an external gate command detection circuit 242, a signal buffer 244, a switch 246 controlled by the logic circuits 236, a MOSFET driver 248, a fixed off-time timer 250, and over and under voltage lockout circuits 252.

$V_{IN}$ input is coupled to a voltage provided from the bridge rectifier and filters 104 (FIG. 1) and is used as an input voltage to the high voltage regulator 230 dependent upon the AC line voltage 102. The high voltage regulator 230 may be a linear regulator that provides a lower voltage $V_{DD}$ for powering the MOSFET driver 248 and other internal bias voltages (bias circuits 232). $V_{DD}$ may also be provided from an external source (e.g., V_Bias from the transformer 122 (FIG. 1) such that the internal high voltage regulator 230 may turn off, thereby saving internal power dissipation within the start-up controller 106. The voltage $V_{DD}$ may be monitored by the over and under voltage lockout circuits 252 to protect the circuits within the start-up controller 106 from out of design specification voltages. Internal biases and voltage references may be provided by the internal bias voltage circuits 232 which may receive its input operating voltage from the high voltage regulator 230 or an external source for $V_{DD}$, e.g., transformer 122.

Gate drive commands to the gate driver 248 may be switched between two sources using switch 246 that may be controlled by the logic circuits 236. The first source may be the internal current regulator and logic circuits 236, and the second may be from an external source coupled to the PWM input and internally buffered by the signal buffer 244.

Current flowing through the MOSFET switch 116 may be monitored by an analogous voltage developed across resistor 124 that may be coupled to the current sense (C/S) input of the start-up controller 106. The MOSFET current is the same as the primary current of transformer. When the gate driver 248 begins driving the MOSFET switch, the logic circuits 236 start the fixed blanking time circuit 240 that then momentarily blanks the signal at the current sense (C/S) node from reaching the internal current regulator and logic circuits 236 so that the internal current regulator therein may ignore the initial turn-on current spike through the MOSFET switch 116. The first comparator 234 and the second comparator 238 monitor the voltage at the current sense (C/S) input. The first comparator 234 monitors the voltage at the C/S node for a brief time interval after the blanking time period of the fixed blanking time circuit 240 has finished. If the voltage at the C/S node exceeds a first voltage reference ($V_{REF1}$) during this brief time interval then the gate drive is terminated. The second comparator 238 sets the maximum voltage allowed (current through the MOSFET switch 116) at the current sense (C/S) input. If the voltage at the current sense (C/S) input is greater than a second voltage reference ($V_{REF2}$) then the gate drive is also terminated. When the gate drive is terminated it remains off for a time period determined by the fixed off-time circuit 250. This off time period may be externally selected by the capacitance value of a capacitor 107 at the $T_{OFF}$ node of the start-up controller 106.

When an external signal is applied to the pulse width modulation (PWM) input node it may be detected by the external gate command detection circuit 242. When an external PWM signal is so detected, logic within the logic circuits 236 cause the switch 246 to couple this external PWM signal to drive the MOSFET driver 248, thereby controlling the power MOSFET switch 116 from a PWM source external to the start-up controller 106. The PWM signal frequency may be, for example but is not limited to, from about 20 kHz to about 65 kHz. If the PWM signal at the PWM input node ceases switching (e.g., remains in either a high or low state) for more than a certain number of switching periods, e.g., five switching periods at 20 kHz (250 microseconds) then the logic within the logic circuits 236 causes the switch 246 to switch back to the PWM output of the logic circuits 236, whereby the MOSFET driver 248 is then driven from the PWM output of the logic circuits 236. The ground node (Gnd) is the circuit ground or common point for the circuits in the start-up controller 106. This ground node may provide a return point for both the PWM drive current to the external MOSFET switch 116 and for bias return currents of the voltages at the $V_{IN}$ and $V_{DD}$ nodes.

Referring back to FIG. 1, the start-up controller 106 is not a primary-side power supply controller that can linearly regulate the output of a flyback power converter via transformer coupling. It does not duplicate the precision reference and voltage error amplifier of a secondary-side controller 118. The start-up controller 106 basically has two modes of operation: In the first mode, during start-up of the flyback power converter 100, it performs as an open-loop current regulator that drives the MOSFET switch 116 until the secondary-side controller 118 takes control (command) of the PWM signals that drive the MOSFET switch 116. In the second mode, once the secondary-side controller 118 is fully operational, it starts sending PWM signal commands to the start-up controller 106 through the isolation circuit 108. Once external PWM signal commands from secondary-side controller 118 (via isolation circuit 108) are received by the start-up controller 106, its internal gate driver 248 may be coupled to the external PWM signal, whereby the secondary-side controller 118 now controls the MOSFET switch 116.

The secondary-side controller 118 may be either an analog controller or a digital controller (or an analog/digital hybrid). Very sophisticated control methods may be used by the secondary-side controller 118, as long as the output of these control methods provides a PWM signal (which is typical). The secondary-side controller 118 may communicate with the application load 128 (which loads the flyback power converter 100 via switching post regulator 120) for additional control sophistication.

Since the PWM signal commands (PWM pulses) from the secondary-side controller 118 drive the isolation circuit 108 (e.g., optocoupler, pulse transformer) on or off, and does not require any circuit linearity, optocoupler CTR concerns are not an issue, according to the teachings of this disclosure. The open-loop current regulator, comprising the start-up controller 106, is designed to operate the flyback power converter 100 in a highly discontinuous mode of operation that provides a small amount of start-up power to a secondary winding of the transformer 122 whereby an output capacitor 126 is charged up and supplies operating voltage to the secondary-side controller 118.

The ON time (driving the external MOSFET switch 116 on) is typically determined by the amount of time it takes the PWM signal at the C/S node of the start-up controller 106 to ramp from zero volts to the $V_{REF2}$ voltage of the second comparator 238. The OFF time (driving the external MOSFET switch 116 off) may be determined by the fixed time-off timer 250. The time duration of the fixed time-off timer 250 may be determined by the value of a capacitor 107 coupled to the $T_{OFF}$ node of the start-up controller 106. For example, a flyback converter rated for 20 watts of power can be made to deliver approximately one (1) watt of output power using the open-loop current regulator techniques and a long enough OFF time set by the capacitor 107 coupled to the $T_{OFF}$ node.

When an external PWM signal is applied to the PWM node of the start-up controller 106 and detected by the external gate command detection circuit 242, switch 246 changes the input to the gate driver 248 from the internal current regulator and logic circuits 236 to the external source (from the PWM node via signal buffer 244). This allows the secondary-side controller 118 to drive the flyback converter 112 at the proper frequency and PWM duty cycle to achieve rated output power and output voltage regulation. In this mode the start-up controller 106 is simply a primary-side biased gate driver. However, the start-up controller 106 still provides the current protection afforded by the first and second voltage comparators 234 and 238. If either of the first or second voltage comparators 234 or 238 trips (changes output state) then switch 246 will change back to the position where it gets its commands from the internal current regulator and logic circuits 236 where the OFF time is set by the fixed time-off timer 250. Wherein the switch 246 cannot change position back to receiving commands via the signal buffer 244 until the end of the time period set by the fixed off-time timer 250. When the external PWM signal from the secondary-side controller 118 via the isolation circuit 108 ceases (remaining in either a high state or a low state) (no longer being detected by the external gate command detection circuit 242) for a time period exceeding 250 μs, switch 246 will change back to the position where it gets its commands from the internal current regulator and logic circuits 236.

The over and under voltage lockout circuits 252 ensure that the peak voltage at the gate node is within the proper range for the external power MOSFET switch 116 of the flyback converter 112. The under-voltage lockout (UVLO) circuit ensures enough voltage is available to properly enhance the gate of the MOSFET 116. The over-voltage lockout (OVLO) circuit ensures that the voltage does not exceed the typical gate voltage ratings of the power MOSFET 116. The OVLO circuit 252 also provides another important function: It must protect from a failure of the secondary-side controller 118 to start up and regulate. If the secondary-side controller 118 does not take command, the start-up controller 106 will continue to charge the output capacitor 126 until it reaches the over-voltage threshold. This voltage on the output capacitor 126 is reflected back to the $V_{DD}$ node of the start-up controller 106 via the transformer 122 winding coupling and will trip the OVLO circuit in the start-up controller 106. When the high voltage limit of the OVLO part of circuit 252 is exceeded the MOSFET driver 248 output will be inhibited. The OVLO circuit 252 may have, for example but is not limited to, a two (2) volt hysteresis band. Therefore gating of the MOSFET switch 116 is halted until the voltage at the $V_{DD}$ node of the start-up controller 106 decays below the lower limit of OVLO circuit's 252 hysteresis band. For an additional layer of over-voltage protection (in case the secondary-side controller 118 fails) a power Zener diode 130 (or some other form of active shunt regulator) may be placed across the output of the transformer 122 (e.g., across capacitor 126). Since the output power of the flyback power converter 100 can be set low by choosing a long OFF time with the capacitor 107 on the $T_{OFF}$ node of the start-up controller 106, wherein the output of the transformer 122 via rectifier 135 can be reasonably protected against over-voltage by using a power Zener diode 130 shunted across the DC output therefrom.

Figure 4:
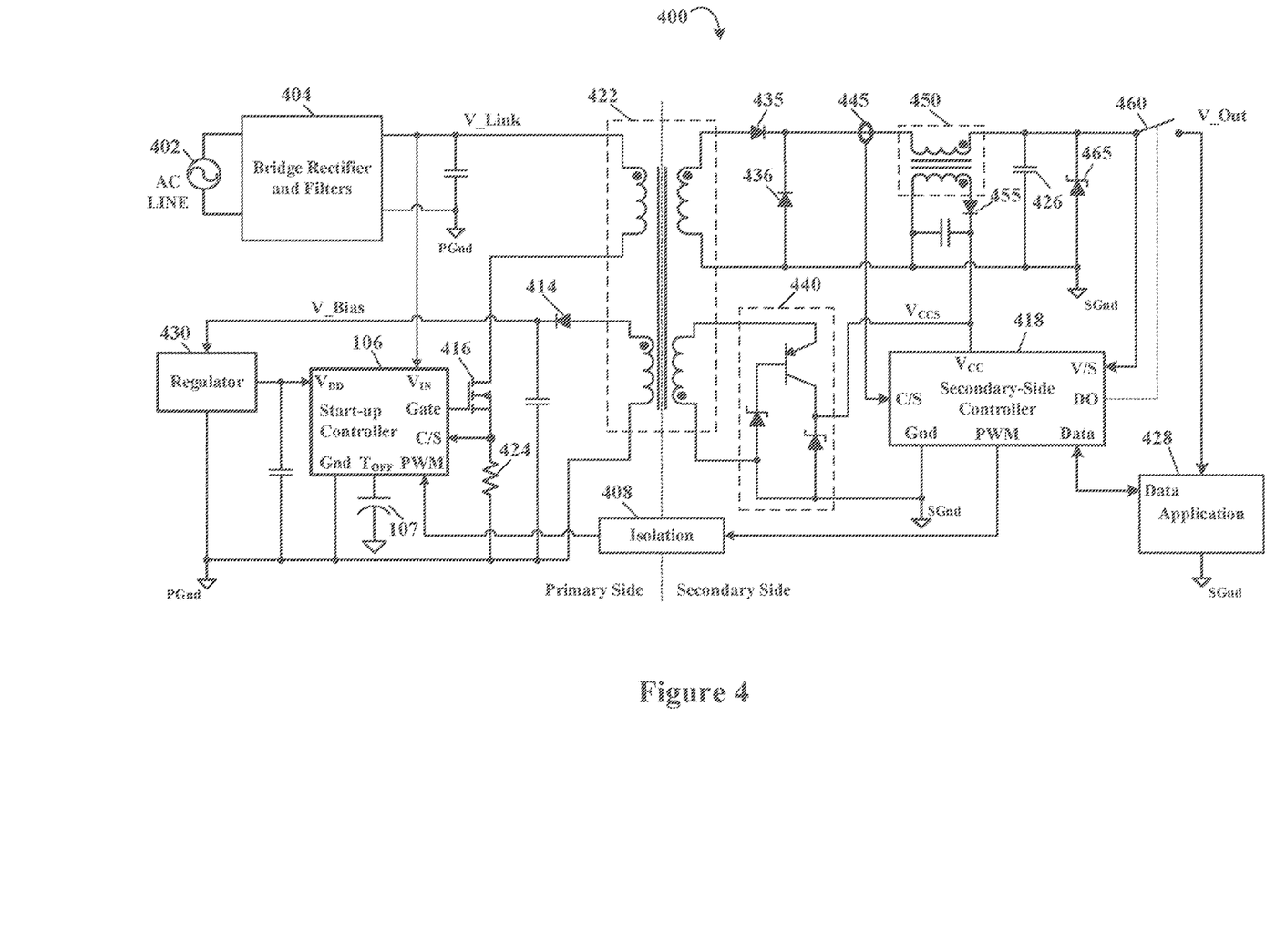
FIG. 4 illustrates a schematic block diagram of a forward power converter comprising a primary-side start-up technique, according to another specific example embodiment of this disclosure.

Referring now to FIG. 4, depicted is a schematic block diagram of a forward power converter comprising a primary-side start-up technique, according to another specific example embodiment of this disclosure. A forward power converter, generally represented by the numeral 400, may comprise a primary side power rectifier and filters 404 coupled to an AC line power source 402, a start-up controller 106, a capacitor 107, a regulator 430, a MOSFET switch 416, a resistor 424 for current sensing, a bias voltage rectifier 414, a transformer 422, a secondary-side controller 418, power rectifiers 435 and 436, an active clamp circuit 440, a current sense transformer 445, an inductor 450, a diode 455, a clamp Zener diode 465, a switch 460, an isolation circuit 408, and an application load 428. A DC source may be used instead of using the primary side power rectifier and filters 404 coupled to an AC source.

The transformer 422 may comprise four (4) windings: 1) a primary winding coupled to V_Link, 2) a secondary winding coupled to power rectifiers 435 and 436, 3) a reset winding coupled to the active clamp circuit 440, and 4) a tertiary winding coupled to rectifier 414. The AC line 402 may be in a universal range of from about 85 to 265 volts alternating current (AC) at a frequency of from about 47 Hz to about 63 Hz. It is contemplated and within the scope of this disclosure that the embodiments disclosed herein may be adapted for other voltages and frequencies. When AC line power source 102 is applied to the primary side power rectifier and filters 404, a DC voltage, V_Link, results. This DC voltage, V_Link, is coupled to a primary winding of transformer 422 and the $V_{IN}$ input of the start-up controller 106. The start-up controller 106 is initially biased by V_Link (via its $V_{IN}$ node) upon application of the AC Line power source 402. The start-up controller 106 becomes active when the voltage, V_Link, reaches a sufficient voltage for proper operation thereof. Once so biased, the start-up controller 106 gates MOSFET switch 416 on and off. The start-up controller 106 provides open-loop regulation of the current through the primary winding of transformer 422 by monitoring the voltage developed across the current sense resistor 424 coupled to its C/S node.

When the MOSFET switch 416 is gated on, the dot sides (phasing) of the Transformer 422 windings are positive allowing current to flow through the primary winding, secondary winding, and tertiary winding. Current flows through rectifier 414 and through the voltage regulator 430 to provide bias to the $V_{DD}$ port of the start-up controller 106. Current also flows through rectifier 435, current sense transformer 445, the main winding of inductor 450, and charges capacitor 426. At this time the application load 428 is isolated because switch 460 is open. When the MOSFET 416 switch is gated off, current flows through the reset winding to the active clamp circuit 440. The active clamp circuit 440 clamps the reset winding voltage by the Zener diode on the gate of the PNP transistor thereof. The Zener diode on the collector of the PNP transistor clamps the voltage $V_{CCS}$. $V_{CCS}$ is the bias voltage for the secondary-side controller 418. Magnetization energy from the reset of transformer 422 may be used to help bias the secondary-side controller 418. When MOSFET switch 416 is gated off current flows through the tertiary winding of inductor 450 coupled to diode 455. This also allows energy to flow to provide voltage $V_{CCS}$. Once the forward power converter 400 is operational current flowing via diode 455 to the voltage $V_{CCS}$ will be the main source of operating power for the secondary-side controller 418.

When $V_{CCS}$ reaches a sufficient voltage, the secondary-side controller 418 can send gating commands to the start-up controller 106 via the isolation circuit 408. Now the gating of the MOSFET switch 416 is controlled by the secondary-side controller 418. The secondary-side controller 418 may then regulate the voltage V_OUT, close the switch 460, and apply power to the application load 428.

There are some key differences when using a start-up controller 106 to start-up a flyback power converter 100 or a forward power converter 400. For example, the voltage on the tertiary winding of transformer 422 is not coupled to the output voltage of the forward converter 400. Instead it is coupled to V_Link. Therefore no secondary voltage information is available via transformer coupling. That is why voltage regulator 430 is needed to regulate the voltage on the VDD port of the start-up controller 106. Also, because of the lack of voltage information via the transformer 422 tertiary winding, the over-voltage protection strategy is different in the event of the failure of the secondary-side controller 418. During start-up the power delivered to the output is set to be low with a selected value capacitor 107 coupled to the $T_{OFF}$ node (port) of the start-up controller 106 (see FIG. 2). The Zener diode on the collector of the PNP transistor of the active clamp circuit 440 clamps the voltage on $V_{CCS}$ and protects the secondary-side controller 418 from over-voltage. Components across the output of the forward converter 400 may be protected by Zener diode 465. Both of these Zener diodes act as protective shunt regulators. Comparator 234 shown in FIG. 2 is not needed in the forward power converter 400 design. Its purpose is to keep the flyback power converter 100 from entering into a continuous conduction mode of operation. However, the main winding of inductor 450 of a forward power converter 400 is typically kept in a continuous conduction mode.

A power Zener diode 130/465 may be placed in parallel with capacitor 126/426, wherein the cathode of the Zener diode 130/465 is coupled to the positive side of capacitor 126/426 and the anode of the Zener diode 130/465 may be coupled to the negative side of capacitor 126/426. In this configuration the Zener diode 130/465 is shunted across the output of the flyback power converter 100 or forward power converter 400. The Zener diode 130/465 breakdown voltage is higher than a normal voltage output on the capacitor 126/426. If a secondary-side controller 118 failure occurs and an over-voltage results, the output voltage will rise until the Zener diode 130/465 breaks over and clamps the over-voltage. The Zener diode 130/465 will dissipate the output power of the flyback or forward power converters 100 or 400, respectively, determined by the capacitance value of the capacitor 107 at the $T_{OFF}$ pin of the start-up controller 106. The Zener diode 130/465 should be rated for at least that power dissipation. It is contemplated and within the scope of this disclosure, that the function of the Zener diode 130/465 may be replaced by active circuitry that performs this shunt clamp function. This is typically done if a more accurate breakdown voltage is required.

Basically, a purpose of the start-up controller 106 is to start-up a power converter 100/400 by having an open loop-current regulator with a short ON time (the MOSFET switch 116/416 is gated ON) and a very long OFF time (the OFF time is determine by the capacitor value placed on the T-off node of the start-up controller 106 in FIG. 2). In this way a power converter 100/400 rated for powers ranging from about 20 watts to 60 watts may have a start-up power of about one (1) watt. So, in an open-loop manner, one (1) watt of power may be delivered to the secondary to charge up the converter's output capacitor 126/426 and start up the secondary-side controller 118/418. Normally the secondary-side controller 118/418 would start up in time to prevent the output capacitor 126/426 from over-charging (over-voltage). However, if the secondary-side controller 118/418 fails to start then the open loop start-up controller 106 will continue to charge the output capacitor 126/426 (its open loop, meaning it gets no voltage feedback). So it's necessary to clamp the voltage across the output capacitor 126/426 to a voltage somewhere around 125% of the normal rated output voltage for protection. This can be done simply using a Zener diode 130/465 with the appropriate breakdown voltage. This Zener diode 130/465 needs to be rated to handle the start-up power. For example, a Zener diode rated for two (2) watts will easily handle the (1) watt start-up power. A power converter 100/400 with a failed secondary-side controller 118/418 will remain in this Zener-clamped state until the AC line power source 102/402 is removed. For a forward converter 400, this is the only way to protect against overvoltage if the secondary-side controller 418 fails to start. For a flyback converter 100 the start-up controller's 106 OVLO lockout circuits 252 may also be employed to prevent over-voltage in the event of a failure of the secondary-side controller 118. In this case, the Zener 130 clamp provides an additional level of protection.

The invention claimed is:

1. A power converter, comprising:
    a start-up controller, comprising:
        a high voltage regulator having an input and an output;
        internal bias voltage circuits coupled to the high voltage regulator output;
        under and over voltage lockout circuits coupled to the high voltage regulator output;
        a current regulator;
        logic circuits for generating pulse width modulation (PWM) control signals;
        a fixed off time circuit coupled to the logic circuits;
        a power driver coupled to the logic circuit and providing the PWM control signals for control of an external power switch;
        an external gate command detection circuit coupled to the logic circuits and adapted to receive an external PWM control signal, wherein when the external PWM control signal is detected the external gate command detection circuit causes control of the external power switch to change from the logic circuits to the external PWM control signal; and
        first and second voltage comparators having outputs coupled to the internal current regulator and inputs coupled to a current sense input; and
    a secondary controller;
    wherein the external PWM control signal is configured to be received from the secondary controller.

2. The power converter according to claim 1, further comprising a blanking circuit coupled between the current sense input and the first and second voltage comparator inputs.

3. The power converter according to claim 1, wherein the fixed off time circuit time period is determined by a capacitance value of a capacitor.

4. A power converter, comprising:
    a start-up controller configured to operate in a first operating mode and a second operating mode, comprising:
        a power supply connection configured to be coupled to a first DC voltage;
        a current measurement input connection configured to receive a measuring current to the start-up controller;
        a pulse width modulation (PWM) input connection;
        a power switch control output connection which is controlled by the start-up controller;
        wherein the start-up controller is configured to operate in the first operating mode to receive the first DC voltage and to provide a control signal at the power switch control output connection, wherein a fixed off time circuit is adapted to keep the control signal providing an off state for a connected power switch for a certain time period after the start-up controller has turned off the power switch, and wherein the certain time period is set by an external capacitor coupled with the start-up controller, and
        wherein the start-up controller is configured to be switched to operate in the second mode, in which:
            the start-up controller receives PWM signals through the pulse width modulation input; and
            a switch within the start-up controller is controlled to feed said PWM signals to the power switch control output connection; and
    a secondary controller;
    wherein the PWM signals are configured to be received from the secondary controller.

5. A power converter, comprising:
    a start-up controller, comprising:
        a high voltage regulator having an input and an output;
        internal bias voltage circuits coupled to the high voltage regulator output;
        under and over voltage lockout circuits coupled to the high voltage regulator output;
        a current regulator;
        a supply voltage input connection coupled with a voltage regulator;
        logic circuits for generating pulse width modulation (PWM) control signals at a gate control output connection;
        a pulse width modulation input connection;
        a fixed off time circuit coupled to the logic circuits;
        a power driver circuit configured to provide the PWM control signals with a fixed OFF time period; and
        a pulse width modulation detection circuit coupled to the logic circuits and to the pulse width modulation input connection and adapted to receive an external PWM control signal through the pulse width modulation input connection, wherein when the external PWM control signal is detected the external gate command detection circuit causes control of signals at the gate control output connection to change from the logic circuits to the external PWM control signal; and
    a secondary controller;
    wherein the PWM control signal is configured to be received from the secondary controller.

6. The power converter according to claim 5, wherein the start-up controller further comprises a switch coupling the gate control output connection with either the logic circuits or the pulse width modulation input connection.

7. The power converter according to claim 6, wherein the start-up controller further comprises a buffer coupled between the switch and the pulse width modulation input connection.

8. The power converter according to claim 5, wherein the start-up controller further comprises
    first and second voltage comparators having outputs coupled to the current regulator and inputs coupled to a current sense input.

9. The power converter according to claim 8, wherein the start-up controller further comprises
    a blanking circuit coupled between the current sense input and the first and second voltage comparator inputs.

10. The power converter according to claim 5, wherein the power driver circuit is coupled to the logic circuits and further configured to provide the PWM control signals for control of an external power switch.

11. The power converter according to claim 5, wherein the fixed off time period is determined by a capacitance value of a capacitor.

12. A method of operating a power converter, comprising:
at a secondary controller, generating an external pulse width modulation (PWM) control signal;
at a start-up controller:
receiving a supply voltage at an input connection coupled by a voltage regulator;
generating PWM control signals having a fixed OFF time period at a gate control output connection for control of an external power switch;
receiving the external PWM control signal through a pulse width modulation input connection,
controlling the gate control output connection with the PWM control signals until the external PWM control signal is detected, whereupon the external gate command detection circuit causes control of signals at the gate control output connection to change from the PWM control signals generated by internal logic circuits to the external PWM control signal;
regulate voltage;
regulate current;
operate voltage lockout circuits; and
performing the change by a switch receiving the PWM control signals and the external PWM control signal;
wherein the fixed off time period is determined by a capacitance value of a capacitor.

13. A start-up controller, comprising:
a high voltage regulator having an input and an output;
internal bias voltage circuits coupled to the high voltage regulator output;
under and over voltage lockout circuits coupled to the high voltage regulator output;
a current regulator;
logic circuits for generating pulse width modulation (PWM) control signals;
a fixed off time circuit coupled to the logic circuits;
a power driver coupled to the logic circuits and providing the PWM control signals for control of an external power switch;
an external gate command detection circuit coupled to the logic circuits and adapted to receive an external PWM control signal, wherein when the external PWM control signal is detected the external gate command detection circuit causes control of the external power switch to change from the logic circuits to the external PWM control signal;
first and second voltage comparators having outputs coupled to the internal current regulator and inputs coupled to a current sense input; and
a blanking circuit coupled between the current sense input and the first and second voltage comparator inputs;
wherein:
the fixed off time circuit time period is determined by a capacitance value of a capacitor; and
the external PWM control signal is configured to be received from a PWM input connection and routed inside the startup controller through a buffer and a switch.

* * * * *